United States Patent
Moradian et al.

(10) Patent No.: US 11,768,984 B2
(45) Date of Patent: Sep. 26, 2023

(54) PARAMETER SENSING AND COMPUTER MODELING FOR GAS DELIVERY HEALTH MONITORING

(71) Applicant: Applied Materials, Inc., Santa Clara, CA (US)

(72) Inventors: Ala Moradian, Sunnyvale, CA (US); James Omer L'Heureux, Santa Clara, CA (US); Shuran Sheng, Saratoga, CA (US); Rohit Mahakali, Bangalore (IN); Karthik Ramanathan, Bangalore (IN); Lin Zhang, San Jose, CA (US); Umesh Madhav Kelkar, Cupertino, CA (US); Gopalakrishna B. Prabhu, San Jose, CA (US); Zheng Yuan, Santa Clara, CA (US); Jeonghoon Oh, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 392 days.

(21) Appl. No.: 16/948,522

(22) Filed: Sep. 22, 2020

(65) Prior Publication Data
US 2022/0092241 A1   Mar. 24, 2022

(51) Int. Cl.
*G06F 30/28* (2020.01)
*G01D 21/02* (2006.01)
(Continued)

(52) U.S. Cl.
CPC .............. *G06F 30/28* (2020.01); *G01D 18/00* (2013.01); *G01D 21/02* (2013.01);
(Continued)

(58) Field of Classification Search
CPC .. G06F 30/28; G06F 2111/10; G06F 2113/08; G06F 2119/02; G01D 18/00; G01D 21/02
See application file for complete search history.

(56) References Cited

U.S. PATENT DOCUMENTS 10,860,005 B2 * 12/2020 Asai ................. C23C 16/45523
2002/0055801 A1    5/2002 Reiss et al.
(Continued)

FOREIGN PATENT DOCUMENTS

JP          2015-185824         10/2015

OTHER PUBLICATIONS

PCT Notification of Transmittal of The International Search Report and The Written Opinion Of The International Searching Authority for PCT Application No. PCT/US2021/051339, dated Jan. 10, 2021, 10 pages.

*Primary Examiner* — Steven W Crabb
(74) *Attorney, Agent, or Firm* — Lowenstein Sandler LLP (57) ABSTRACT

A method includes receiving measurement data from multiple sensors positioned along a delivery line that delivers a liquid as a gas to one of a gas panel or a processing chamber; simulating, using a computer-generated model, one or more process parameters associated with the delivery line and a plurality of heater jackets positioned around the delivery line; comparing the measurement data with values of the one or more process parameters; and determining, based on at least a threshold deviation between the measurement data and the values of the one or more process parameters, that a fault exists that is associated with maintaining temperature within the delivery line consistent with a gaseous state of the liquid.

19 Claims, 9 Drawing Sheets

(51) Int. Cl.
  *G01D 18/00*   (2006.01)
  *G06F 119/02*  (2020.01)
  *G06F 111/10*  (2020.01)
  *G06F 113/08*  (2020.01)

(52) U.S. Cl.
  CPC ....... *G06F 2111/10* (2020.01); *G06F 2113/08* (2020.01); *G06F 2119/02* (2020.01)

(56) References Cited

U.S. PATENT DOCUMENTS

| | | | |
|---|---|---|---|
| 2007/0239375 A1* | 10/2007 | Kaushal | G05B 23/0254 |
| | | | 702/33 |
| 2008/0197124 A1 | 8/2008 | Shin | |
| 2010/0076729 A1 | 3/2010 | Davis et al. | |
| 2010/0198556 A1* | 8/2010 | Kost | G05B 23/0221 |
| | | | 702/183 |
| 2010/0332013 A1 | 12/2010 | Choi et al. | |
| 2021/0088867 A1* | 3/2021 | Nagel | G01N 21/8851 |

\* cited by examiner

PARAMETER SENSING AND COMPUTER MODELING FOR GAS DELIVERY HEALTH MONITORING

TECHNICAL FIELD

This instant specification generally relates to gas delivery to a processing chamber. More specifically, the instant specification relates to parameter sensing and computer modeling for gas delivery health monitoring.

BACKGROUND

Manufacturing of modern materials often involves various deposition techniques, such as chemical vapor deposition (CVD) or physical vapor deposition (PVD) techniques, in which atoms or molecules of one or more selected types are deposited on a wafer (substrate) held in low or high vacuum environments that are provided by vacuum processing (e.g., deposition, etching, etc.) chambers. For example, CVD deposition processes are used for a broad spectrum of applications. These applications range from patterning films to insulation materials in transistor structures and between the layers of conducting metal that form the electrical circuit. Applications include shallow-trench isolation, pre-metal dielectric, inter-metal dielectric, and passivation. They are also employed in strain engineering that uses compressive or tensile stress films to enhance transistor performance through improved conductivity. Depending on the type of thin film to be deposited on a substrate, a precursor (gaseous or liquid) is delivered to the process chamber where the thermal oxidation or reactions results in depositing the desired film.

A precursor (as well as other liquid) induces chemical reactions by introducing various types of reactive gases into the processing (or reactive) chambers during semiconductor fabrication. In CVD processing, there is a growing preference to use liquid precursors instead of gases. The popularity of liquid precursors is based in part on physical properties that render them less harmful, flammable, corrosive, and poisonous than gaseous ones. For example, one of the more common liquids used in fabricating semiconductor devices is Tetraethylorthosilicate (TEOS), which is frequently substituted for silane. With TEOS, conformal silicon dioxide ($SiO_2$) films with no detectable defects can be deposited with better step coverage and with far less hazard than silane. In metal organic CVD (MOCVD) processes, liquid precursors for metals such as copper are often used because gaseous ones are not available.

Because liquid precursors (and other process liquids) are first liquid, they are converted to a gaseous state to deliver the precursor as a gas through a delivery line. Faults in the manufacturing operation or delivery line environment, particularly that impact temperature and pressure, can lead to condensation of some of the gas in a delivery line. Such condensation can absorb and carry particles into the processing chamber and deposit the particles on the substrate, causing particle defects on the substrate and any resultant manufactured device.

SUMMARY

In one implementation, disclosed is a method that includes receiving measurement data from multiple sensors positioned along a delivery line that delivers a liquid as a gas to one of a gas panel or a processing chamber. The method further includes simulating, using a computer-generated model executed on a processing device, one or more process parameters associated with the delivery line and a plurality of heater jackets positioned around the delivery line. The method further includes comparing, by the processing device, the measurement data with values of the one or more process parameters. The method further includes determining, by the processing device, based on at least a threshold deviation between the measurement data and the values of the one or more process parameters, that a fault exists that is associated with maintaining temperature within the delivery line consistent with a gaseous state of the liquid.

In another implementation, disclosed is a system that includes a memory and a processing device, operatively coupled to the memory, to receive measurement data from a plurality of sensors positioned along a processing subsystem that delivers a liquid as a gas to a processing chamber. The processing device is further to simulate, executing a computer-generated model, one or more process parameters associated with a processing subsystem. The processing device is further to compare the measurement data with values of the one or more process parameters. The processing device is further to determine, based on at least a threshold deviation between the measurement data and the values of the one or more process parameters, that a fault exists that is associated with maintaining temperature and pressure within the processing subsystem consistent with a gaseous state of the liquid.

In another implementation, disclosed is a non-transitory computer readable storage medium storing instructions that, when executed by a processing device, cause the processing device to perform a plurality of operations, including receiving measurement data from multiple sensors positioned along a delivery line that delivers a liquid as a gas to a processing chamber. The operations further include simulating, by executing a computer-generated model, one or more process parameters associated with the delivery line and a plurality of heater jackets positioned around the delivery line. The operations further include comparing the measurement data with values of the one or more process parameters. The operations further include determining, based on at least a threshold deviation between the measurement data and the values of the one or more process parameters, that a fault exists that is associated with maintaining temperature and pressure within the delivery line consistent with a gaseous state of the liquid.

DETAILED DESCRIPTION

The implementations disclosed herein provide for parameter sensing and computer modeling for precursor and other gas delivery health monitoring. For example, a precursor such as TEOS is liquid at room temperature with a boiling point of 168° C. Thus, TEOS is a liquid precursor that is delivered in the form of gas to a processing chamber, usually after passing through a gas panel. Thus, methods such as boiling, bubbling, or injection are used to convert the precursor to a gaseous state. To prevent condensation of the gaseous precursor, the delivery lines are heated by using multiple heater jackets wrapped around the lines. Improper installation of any of the heater jackets, failure of the heater jackets (physical damage or control issues), or inconsistencies in installation of the heater jackets after a preventative maintenance could all result in situations where the pressure of the gas falls below its saturation pressure and condenses in the lines. Condensation, in turn, results in particle defects, potentially wafer scrap, and lengthy and costly unplanned maintenance procedures.

While the application refers to precursors by way as example, this disclosure is applicable to any gas that is to be maintained within a temperature range in order to avoid condensation back into a liquid state. For example, the gas can be located within a foreline gas line (where gas is entering the processing chamber) or an exhaust gas line (where process gas is exiting the processing chamber), and deposition of the gas as a liquid is to be avoided within the gas lines and elsewhere in a gas delivery system. Preventing this type of conversion to liquid, and corresponding deposition within the delivery lines, can prevent clogging or other adverse pumping performance.

Accordingly, to resolve these deficiencies currently in the art of employing a liquid in a gaseous state, the present implementations track parameters that relate to keeping the liquid in this gaseous state. For example, the parameter could be one or more of temperature, pressure, concentration of the gas, flow rate of the gas, and/or power output of the heater jackets. More specifically, the present implementations employ a computing device to calibrate or machine learn a computer-generated model that is based in physics and that characterizes, via prediction of one or more of these parameters, the physical system of a delivery line and the heater jackets over time.

In various implementations, the computing device can then compare values of the predicted parameter(s) to measurement data received from a number of sensors positioned (e.g., attached) along the delivery line. If there is a variation between the predicted values and the measured data values for a parameter that at least meets a threshold deviation, the computing device detects a fault. In some implementations, the predicted values and the measured values for more than one parameter can be combined. The computing device can further determine (or identify) a deviation pattern of this at least threshold deviation between the measured data and predicted values of the parameter. The computing device can compare the deviation pattern to predetermined deviation patterns, which have been previously correlated with various fault, to determine a specific fault. The computing device can further alert an operator of the specific fault and, optionally, halt processing while the specific fault is resolved and the operator clears the processing to proceed.

This approach can be further applied to a larger set of the physical processing subsystem, e.g., that includes the delivery line, the heater jackets positioned around the delivery line, the gas panel, and the processing chamber. In this way, the computer-generated model can be expanded for use in preventative maintenance, fault detection, or automatic diagnostics outside and inside of the processing chamber in relation to the gaseous state of the precursor or other gas.

In some implementations, the computer-generated model incorporates statistical-based analysis of the measurement data received from the sensors. Additionally, the computing device can further use the measured data from the sensors positioned along the delivery line (or the processing subsystem) to perform reinforcement learning of the computer-generated (e.g. machine learning) model. The reinforcement learning and/or the statistical-based analysis enables updating the computer-generated model and tracking trends of the parameter(s) across sections, elbows, and zones of the delivery line in addition to across other components of the processing subsystem, such as the gas panel and the processing chamber.

The disclosed implementations pertain to a variety of manufacturing techniques that use processing chambers (that may include deposition chambers, etching chambers, and the like), such as chemical vapor deposition techniques (CVD), physical vapor deposition (PVD), plasma-enhanced CVD, plasma-enhanced PVD, sputter deposition, atomic layer CVD, combustion CVD, catalytic CVD, evaporation deposition, molecular-beam epitaxy techniques, and so on. The disclosed implementations may be employed in techniques that use vacuum deposition chambers (e.g., ultrahigh vacuum CVD or PVD, low-pressure CVD, etc.) as well as in atmospheric pressure deposition chambers.

Figure 1A:
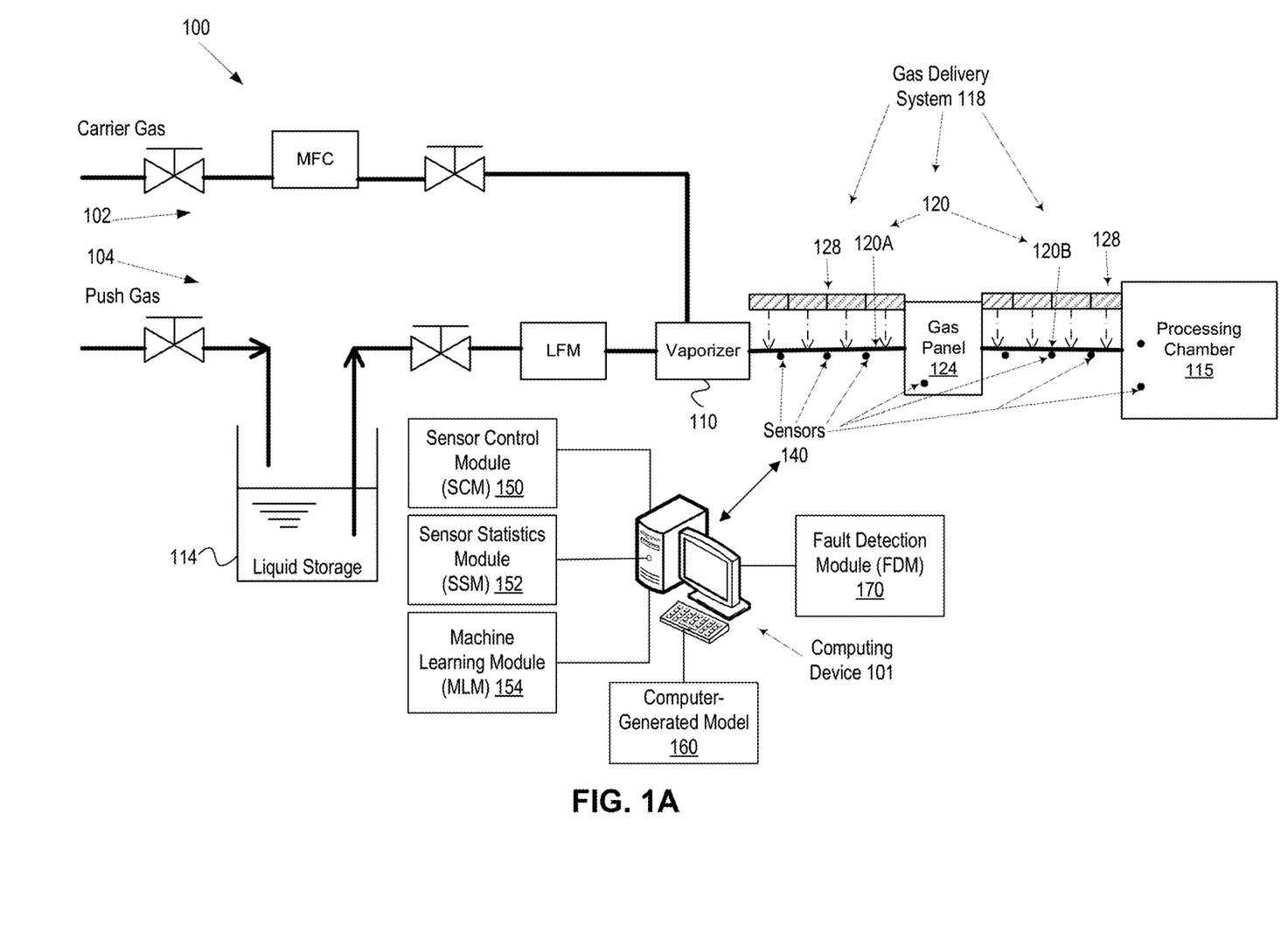
FIG. 1A illustrates one exemplary implementation of health monitoring within a liquid conversion and gas delivery system to a processing chamber according to some implementations.

FIG. 1A illustrates one exemplary implementation of health monitoring within a liquid conversion and gas delivery system 100 to a processing chamber according to some implementations. The liquid conversion portion of the system 100 can include a carrier gas line 102 and a push gas line 104. The carrier gas line 102 can include flow control valves and a mass flow controller (MFC) to take the carrier gas (usually an inert gas) into a vaporizer 110. The push gas line 104 can include flow control valves, a liquid storage container 114, and a liquid flow meter (LFM) in order to deliver the liquid also to the vaporizer 110. The vaporizer 110 can then convert the liquid (such as a precursor) into a gas by boiling, bubbling, or injection of the carrier gas into the liquid precursor while heating the gas with ambient heaters.

In various implementations, the liquid conversion and gas delivery system 100 includes a gas delivery system 118 that in turn includes a set of delivery lines 120, both before and after a gas panel 124, and multiple heater jackets 128 positioned around the set of delivery lines 120. For example, the set of delivery lines 120 can include a set of facilities gas lines 120A coming from a source of gas within the facility (e.g., the vaporizer 110 in disclosed implementations) and coupled to the gas panel 124, and a set of chamber gas lines 120B coupled between the gas panel 124 and a processing chamber 115 (or multiple processing chambers).

Figure 1B:
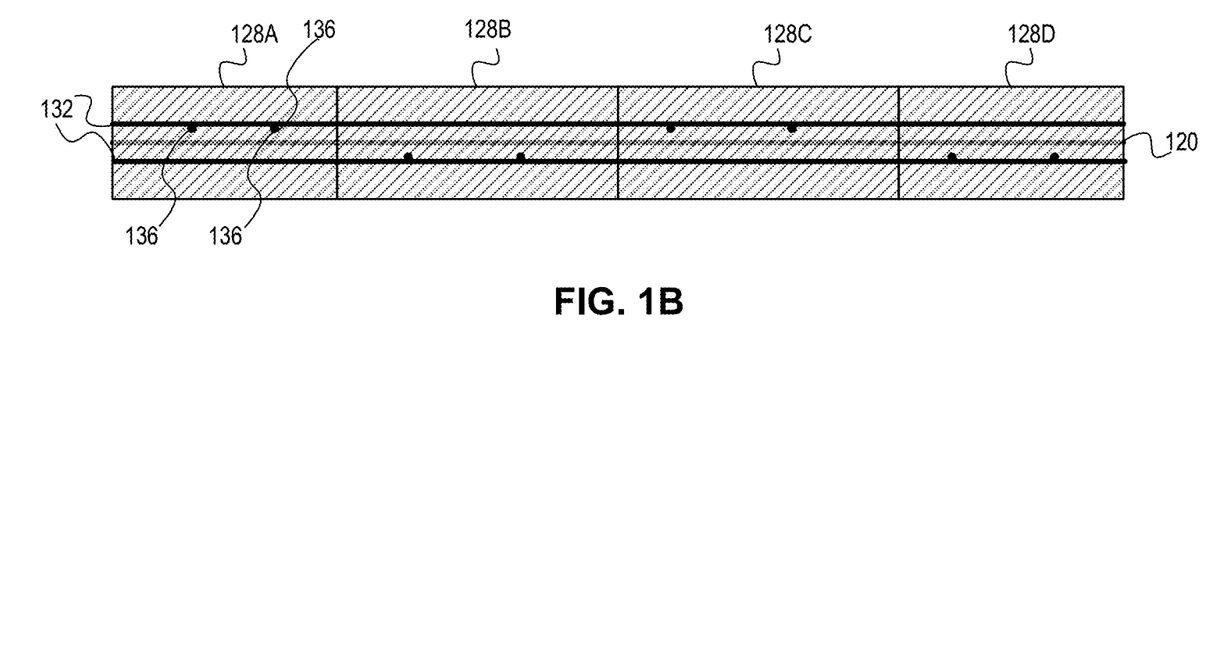
FIG. 1B is an exemplary cross-section view of a portion of a delivery line that includes multiple heater jackets positioned around the delivery line according to some implementations.

The heater jackets 128 are illustrated in a simplified manner and exploded away from the set of delivery lines 120 to not obscure illustration of these components. FIG. 1B, however, is an exemplary cross-section view of a portion a delivery line 120 that includes multiple heater jackets 128A, 128B, 128C and 128D positioned around the delivery line 120 according to some implementations. In other words, the multiple heater jackets are completely wrapped around the outside surface of the delivery line 120. The length of the delivery line 120 can thus be covered by these heater jackets 128 to keep the delivery line 120 sufficiently heated to maintain the gas in a gaseous state.

In these implementations, these heater jackets 128A, 128B, 128C, and 128D will each generally include one or more heating element 132 connected to a power source and have a power output that can be tracked as measurement data. Each heater jacket 128 will generally also include at least one thermocouple 136 (e.g., temperature sensor) to track a temperature of the heater jacket. In some implementations, the heater jackets include a closed-loop control that functions like a thermostat that is coupled between the power source and the heater jacket. When the heater jacket 128 reaches a target temperature, the thermocouple 136 levels off the power delivered to the heater jacket. The thermocouple 136 can then periodically measure the temperature of the heater jackets, and when the temperature drops below a threshold temperature value, can again increase the power delivered to the heater jacket until reaching the target temperature.

Figure 1C:
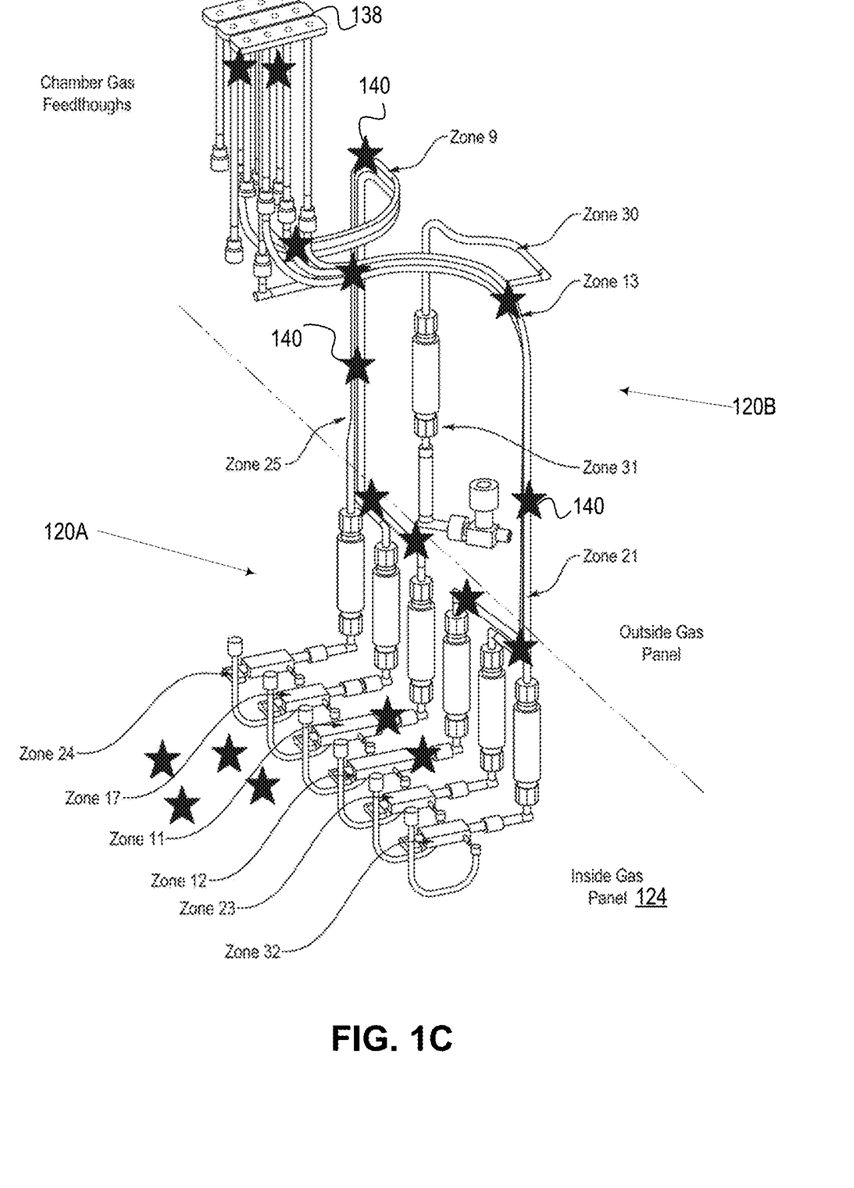
FIG. 1C illustrates delivery lines positioned inside and outside of a gas panel according to one implementation.

FIG. 1C illustrates the set of delivery lines 120 positioned inside and outside of the gas panel 124 according to one implementation. As illustrated, the set of delivery lines 120 entering the gas panel 124 can be a number of the facilities gas lines 120A or feeds running from the facilities gas lines as was discussed. The set of delivery lines 120 exiting the gas panel 124 can be the set of chamber gas lines 120B coupled between the gas panel 124 and a processing chamber such as the processing chamber 115. The ends of the chamber gas lines 120B can be attached to chamber gas feedthroughs 138 attached to multiple processing chambers.

In some embodiments, the set of delivery lines 120 are identified in sections or zones and include various elbows, bends, and other changes in direction. These non-linear features of the set of delivery lines 120 make it more challenging to completely and reliably cover all outer surfaces of the set of delivery lines 120 with the heater jackets 128. Further, during preventative (or required irregular) maintenance, the heater jackets 128 are removed from the set of delivery lines 120. If these heater jackets 128 are not properly reinstalled around the set of delivery lines 120 in what is oftentimes a crowded space of the gas delivery system 118, the delivery lines 120 can be left at least partially exposed to ambient air. This exposure can lead to improper temperature variation in those areas, and thus risk of condensation of the gas back to a liquid state within as least portions of a delivery line.

Figure 2A:
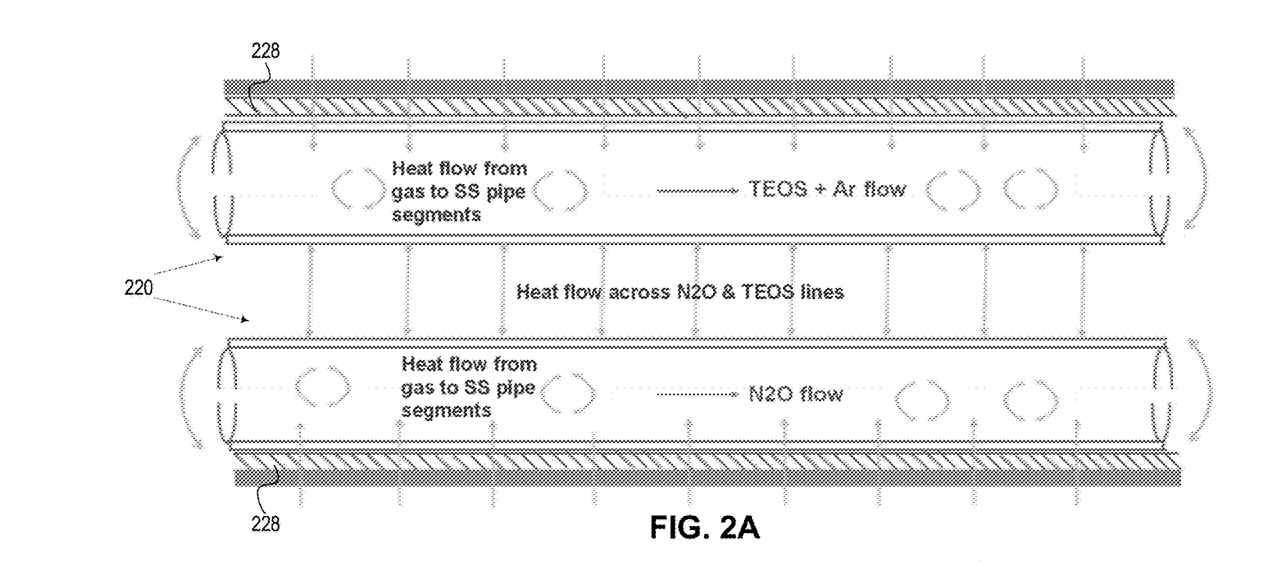
FIG. 2A is an exemplary cross-section of dual delivery lines carrying different gases according to some implementations.

As a specific example, FIG. 2A is an exemplary cross-section of dual delivery lines 220 carrying different gases according to some implementations. The dual delivery lines 220 include a top delivery line carrying TEOS and argon (Ar) gas and a bottom delivery line carrying nitrous oxide ($N_2O$). Note the various light-colored arrows indicate heat flow coming from a heater jacket 228 positioned around the dual delivery line 220. For example, heat flows from the heater jacket 228 to the stainless steel (or other metallic) pipe of the dual delivery lines 220. Heat also flows across two segments of each delivery line until the heat also flows in a gap between the dual delivery lines 220. Within the dual delivery lines 220, heat also flows from the heated gas to the stainless steel pipes of the dual delivery lines 220. The physics-based model that will be discussed in more detail can factor into consideration these surfaces, including contact resistances, and the gas itself in fluid dynamic and heat transfer equations.

Figure 2B:
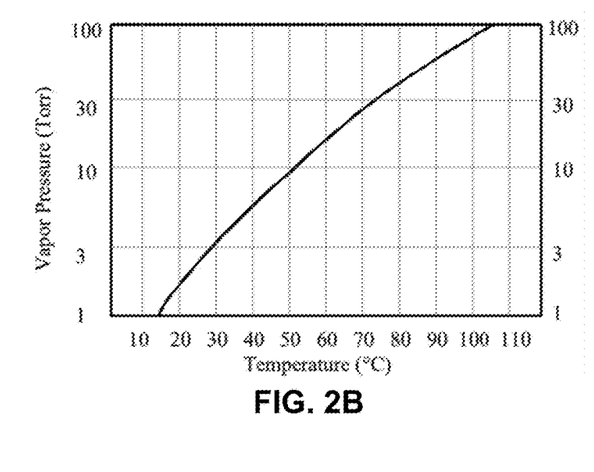
FIG. 2B is a graph that illustrates an example of how vapor pressure varies with temperature of tetraethylorthosilicate (TEOS) in the delivery line according to an implementation.

FIG. 2B is a graph that illustrates an example of how vapor pressure varies with temperature of TEOS in the top delivery line according to an implementation. Thus, the temperature itself impacts the pressure within the delivery line, which is to be kept sufficiently constant and above the saturation pressure in order to avoid condensation.

With additional reference to FIG. 1A, a number of sensors 140 are positioned along the gas delivery system 118, including along the set of delivery lines 120 and optionally also inside of the gas panel 124 and the processing chamber 115, which together will be referred to herein as a processing subsystem. FIG. 1C illustrates potential positions for some these sensors 140 as stars overlaid at various locations along the set of delivery lines 120. In one implementation, the sensors 140 are a set of temperate sensors that are synchronized and coupled to a computing device 101, which includes a memory operatively coupled to a processing device (see FIG. 7). The sensors 140 can be coupled via a wired connection and/or wirelessly with the computing device 101. In an alternative embodiment, the computing device 101 is or includes an edge device located locally to the sensors 140.

In various implementations, these sensors 140 can include one or more of a thermocouple, a pressure sensor, a concentration sensor, an optical sensor, a gas flow sensor, or a heater jacket power output sensor. Thus, some of the sensors 140 are attached to a delivery line 120 while other sensors are positioned or attached to an inside of the delivery line, within the gas panel 124, and/or within the processing chamber 115. The temperature sensors can detect temperature, which as discussed with reference to FIG. 2B, is related to pressure. Or, alternatively, pressure can be directly measured by a pressure sensor. The pressure in the delivery line can be correlated to a particular gas (e.g., precursor) mixture and determined whether it drops below its saturation pressure, and thus into condensation.

In related or different implementations, the concentration sensor can sense a concentration of the gas in the delivery line, which can be another way to detect condensation. The concentration sensor can be a piezocone, for example. Or, an optical sensor can be used such as a chromatographic sensor or a nondispersive infrared (NDIR) sensor, in which the concentration of the gas is proportional to the absorption to a particular wavelength and can identify particular compounds in a scanned gas. The optical sensor can thus detect a change in phase of the liquid, which is indicative of condensation. The heater jacket power output sensor can be coupled to the heater jacket and detect an anomaly or other deviation from an expected level of power, which could indicate a defective heater jacket.

In various embodiments, the computing device 101 in FIG. 1A can execute instructions stored in the memory to instantiate various modules or components of the computing device 101, including a sensor control module (SCM) 150, a sensor statistic module (SSM) 152, a machine learning module (MLM) 154, and a fault detection module (FDM) 170. A computer-generated model, to include a machine learning model in some embodiments, can be stored in the memory and referenced during the parameter sensing and computer modeling for gas delivery health monitoring.

The SCM 150 can activate sensors, deactivate sensors, place sensors in an idle state, change settings of the sensors, detect sensor hardware or software problems, and so on. In some implementations, the SCM 150 can keep track of the processing operations performed by the system 100 and determine which sensors 140 are to be sampled for a particular processing (or diagnostic, maintenance, etc.) operation of the system 100.

The SSM 152 can process the raw data obtained by the SCM 150 from the sensors 140 and determine statistics representative of the raw data. For example, for each or some of the raw sensor data distributions, the SCM 150 can determine one or more parameters of the distribution, such as a mean, a median, a mode, an upper bound, a lower bound, a variance (or a standard deviation), a skewness (third moment), a kurtosis (fourth moment), or any further moments or cumulants of the data distribution. In some implementations, the SCM 150 can model (e.g., via regression analysis fitting) the raw data with various model distributions (normal distribution, log-normal distribution, binomial distribution, Poisson distribution, Gamma distribution, or any other distribution. In such implementations, the one or more parameters can include an identification of the fitting distribution being used together with the fitting parameters determined by the SCM 150.

In some implementations, the SCM 150 can use multiple distributions to fit the raw data from one sensor, e.g., a main distribution and a tail distribution for outlier data points. The parameters of the distributions obtained by the SCM 150 can be sensor-specific. For example, for some sensors, a small number of parameters can be determined (mean, median, variance) whereas for some sensors, many more (e.g., 10 or 20) moments can be determined.

In various implementations, the computer-generated model 160 includes at least one of fluid dynamics equations, heat transfer equations, and/or thermal contact resistance equations associated with the delivery line or with the processing subsystem. The heat transfer equations can be of at least three types, including but not limited to, heat conduction, heat convention, and heat radiation. The thermal contact resistance equations can model a less than perfect heat transfer (e.g., conduction) between two surfaces in contact with each other, as can be the case with various sensors. Other thermodynamics or physics-based equations are envisioned. The computer-generated model can be an aggregation or mix of at least some of these equations.

In some implementations, the computing device 101 can calibrate the computer-generated model 160, as will be discussed in more detail with reference to FIG. 4. In other implementations, the MLM 154 of the computing device 101 can train a machine learning model using, as inputs, a training dataset measured by the multiple sensors 140 and associated with the one or more process parameters to provide the computer-generated model 160 in lieu of strictly algorithmic amalgamation. The machine learning model implementation will be discussed in more detail with reference to FIG. 5. In some implementations, the MLM 154 is located on a remote server or can be distributed across multiple processing devices and which operates on the training dataset to train the machine learning model, and send the machine learning model back to the computing device 101 for storage and use.

In various implementations, the FDM 170 can compare values of the predicted parameter(s) to measurement data received from the multiple sensors 140 positioned (e.g., attached) along the delivery line 120. If there is a variation between the predicted values and values of the measured data for a parameter that at least meets a threshold deviation, the FDM 170 detects a fault. In some implementations, the FDM 170 can combine the predicted values and the measured data values for more than one parameter, e.g., statistically or otherwise, in order to determine a fault based on more than on parameter such as temperature, pressure, concentration of the gas, flow rate of the gas, and/or power output of the heater jackets. The FDM 170 can further determine (or identify) a deviation pattern of this at least threshold deviation between the measured data values and the predicted values of the parameter(s). The FDM 170 can compare the deviation pattern to predetermined deviation patterns, which have been previously correlated with various fault, to determine a specific fault. The computing device 101 can further alert an operator of the specific fault and, optionally, halt processing while the specific fault is resolved and the operator clears the processing to proceed.

In some implementations, during calibration runs as well as tracking parameter values over time that tend to correlate to identified faults, additional or more nuanced variation patterns can be correlated to specific faults and stored, e.g., in a table or other data structure of the memory of the computing device 101. The FDM 170 can access this table or data structure during automated diagnostics or post preventative maintenance analysis, to determine whether a fault is detected. The specific faults that the FDM 170 can determine include, but not be limited to: leakage of ambient air, past the heater jackets 128, into direct contact with the delivery line 120; lack of sensitivity to change in flow rate of the gas; partial pressure of the gas predicted by the computer-generated model 160 lower than a saturation pressure of the liquid; an input power to one or more of the plurality of heater jackets outside of a predetermined range that maintains a target temperature in the delivery line; temperature of the gas in a chamber manifold is lower than historical temperature values; or unexpected fluctuations in a sensor signal from one of the multiple sensors 140.

The above approach can be further applied to a larger set of the physical processing subsystem, e.g., that includes the delivery line 120 (or multiple delivery lines), the heater jackets 128 positioned (e.g., wrapped) around the delivery line 120, the gas panel 124, and the processing chamber 115. In this way, the computer-generated model 160 can be expanded for use in preventative maintenance, fault detection, or automatic diagnostics outside and inside of the processing chamber 115 in relation to the gaseous state of the liquid.

In some implementations, the computer-generated model 160 incorporates statistical-based analysis of the measurement data received from the sensors 140. Additionally, the computing device 101 can further use the measured data from the sensors positioned along the delivery line (or the processing subsystem) to perform reinforcement learning of the computer-generated model 160 (or machine learning model). The reinforcement learning and/or the statistical-based analysis enables updating the computer-generated model and tracking trends of the parameter(s) across sections, elbows, and zones of the delivery line in addition to other components of the processing subsystem, such as the gas panel 124 and the processing chamber 115. Further, to compare the measurement data with values of the one or more process parameters can include to compare the measurement data for a section of a number of sections of a delivery line to a specific value of the one or more process parameters corresponding to the section. Thus, the diagnostic analysis discussed herein can be performed at a granularity of different sections, zones, or elbows of the delivery line 120, or as an aggregate of such components.

Furthermore, by virtue of the reinforcement learning and other updates performed to the computer-generated model 160, the computing device 101 can take offline one or more of the multiple sensors 140. Alternatively, the one or more of the multiple sensors 140 can be removed, e.g., during preventative maintenance when operators have access to the sensors 140. This is because the computer-generated model 160 will be sufficiently calibrated or trained to need only sparse and/or infrequent measurement data to maintain accuracy. The need for fewer sensors 140 saves resources and simplifies the system 100 long term.

Figure 3:
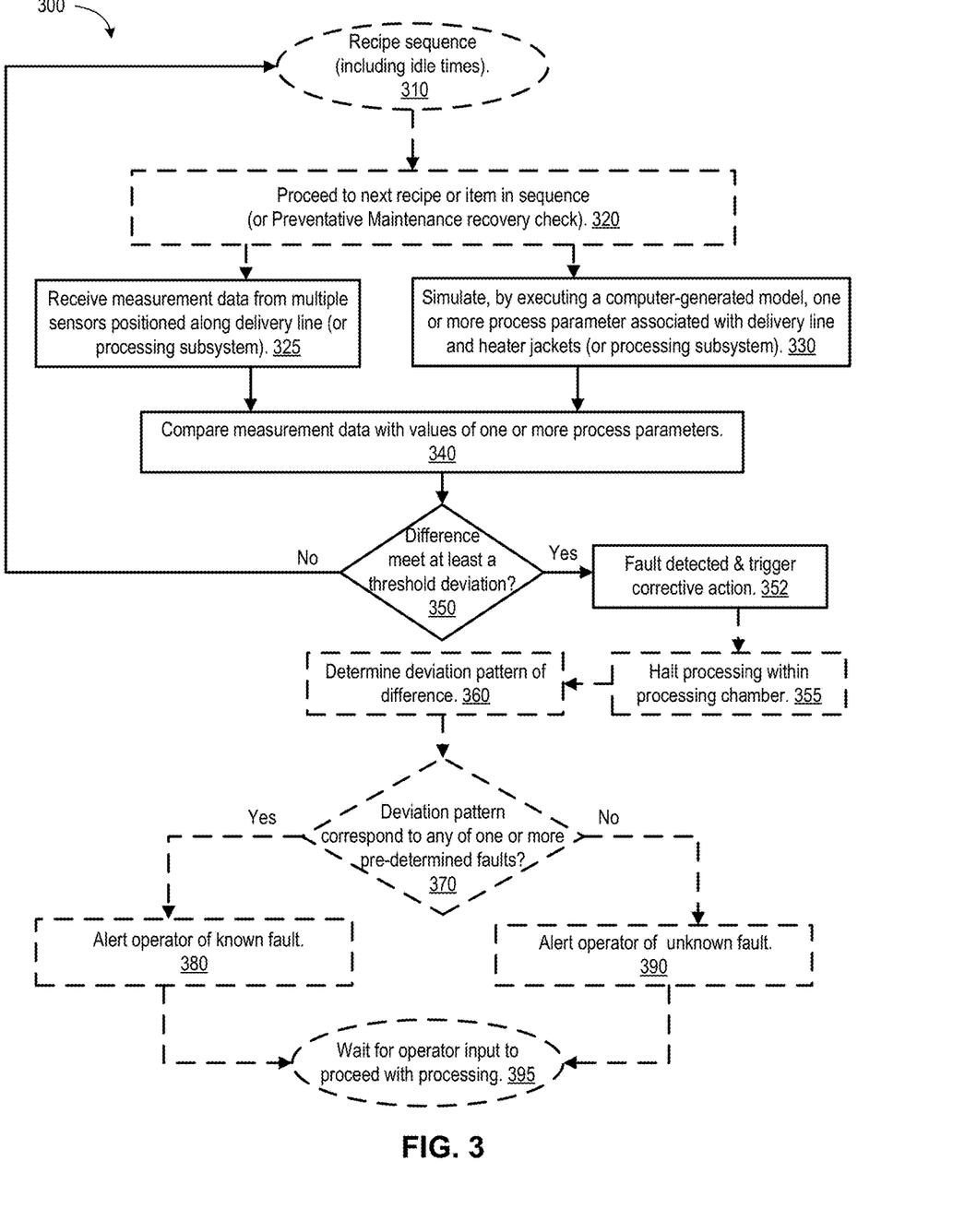
FIG. 3 is a flow diagram of a method for monitoring the health of delivery of a liquid in a gaseous state to a processing chamber according to some implementations.

FIG. 3 is a flow diagram of a method 300 for monitoring the health of delivery of a liquid in a gaseous state to a processing chamber according to some implementations. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the system 100 and components shown in FIGS. 1A-2A or any combination thereof. The method 300 can be performed using a single processing device or multiple processing devices. Some of the operations of method 300 can be optional, indicated by the dashed lines. In implementations, some operations of the method 300 are performed by a processing device (processor, central processing unit (CPU)) of the computing device 101, e.g., responsive to instructions issued by the fault detection module (FDM) 170.

In various implementations of the method 300, the processing logic, at operation 310, executes a recipe sequence for processing substrates in the processing chamber 115, among other processing chamber, which includes planned idle times. At operation 320, the processing logic proceeds to a next recipe or item in sequence of the recipe sequence. In one implementation, the next recipe to be processed is a preventative maintenance recovery check.

At operation 325, the processing logic receives measurement data from multiple sensors 140 positioned along a delivery line that delivers a liquid as a gas to one of a gas panel or a processing chamber. In another implementation, operation 325 is expanded to include receiving measurement data from multiple sensors 140 positioned along a processing subsystem that delivers a liquid as a gas to the processing chamber.

At operation 330, the processing logic simulates, by executing a computer-generated model, one or more process parameters associated with the delivery line 120 a number of heater jackets 128 positioned (e.g., wrapped) around the delivery line. In another implementation, operation 330 is expanded to include simulating the one or more process parameter across the components of the processing subsystem, e.g., the delivery line 120, the gas panel 124, the number of heater jackets 128, and the processing chamber 115. In some implementations, operation 325 and operation 330 are performed in parallel. In these and alternative implementations, operations 325 and 330 are performed periodically or continuously during processing in order to perform real time diagnostics of at least the delivery line 120 and optionally the processing subsystem.

At operation 340, the processing logic compares the measurement data (from the multiple sensors 140) with values of the one or more process parameters. This comparison can be, for example, a comparison of a first signal received from the multiple sensor 140 with a second signal generated by the computing device 101 executing the computer-generated model 160.

At operation 350, the processing logic determines whether the difference between the measurement data and the values of the one or more process parameters meets at least a threshold deviation. If yes to operation 350, then at operation 352, this threshold deviation can trigger the processing logic to determine a fault has been detected and trigger a corrective action. For example, at operation 355, the processing logic can halt processing (e.g., within the processing chamber 115) in response to a fault determination. Other corrective actions can also be taken, such as compensating for deviation of the temperature in the heater jackets by increasing power to the heater jackets, and the like. If the at least a threshold deviation is not detected, the processing logic can loop back to operation 310 with a next processing step in the recipe sequence for execution, without interruption.

With additional reference to FIG. 3, at operation 360, the processing logic determines a deviation pattern of the at least a threshold deviation between the measurement data and the values of the one or more process parameters. At operation 370, the processing logic determines whether the deviation pattern corresponds to any one or more predetermined faults, which were discussed with reference to FIG. 1A and can accessed in a table or other data structure in memory of the computing device 101. If operation 370 yields a negative response, at operation 380, the processing logic alerts an operator of a known fault, e.g., the specific fault that was determined. If operation 370 yields a positive response, at operation 390, the processing logic alerts the operator of an unknown fault. Such an unknown fault could be sufficient reason to perform preventative maintenance or conduct additional diagnostic steps to attempt to verify the unknown fault. The processing logic can send or issue these alerts to the operator via an input/output (I/O) device coupled to the processing device of the computing device 101.

In either case, at operation 395, the processing logic can wait for an operator input (e.g., via the I/O device) that indicates to proceed before continuing with the processing. This can force the processing logic into a safety period (similar to an emergency stop from the halt performed at operation 355) until an operator manually inserts a command to proceed after having verified the fault has been addressed.

Figure 4:
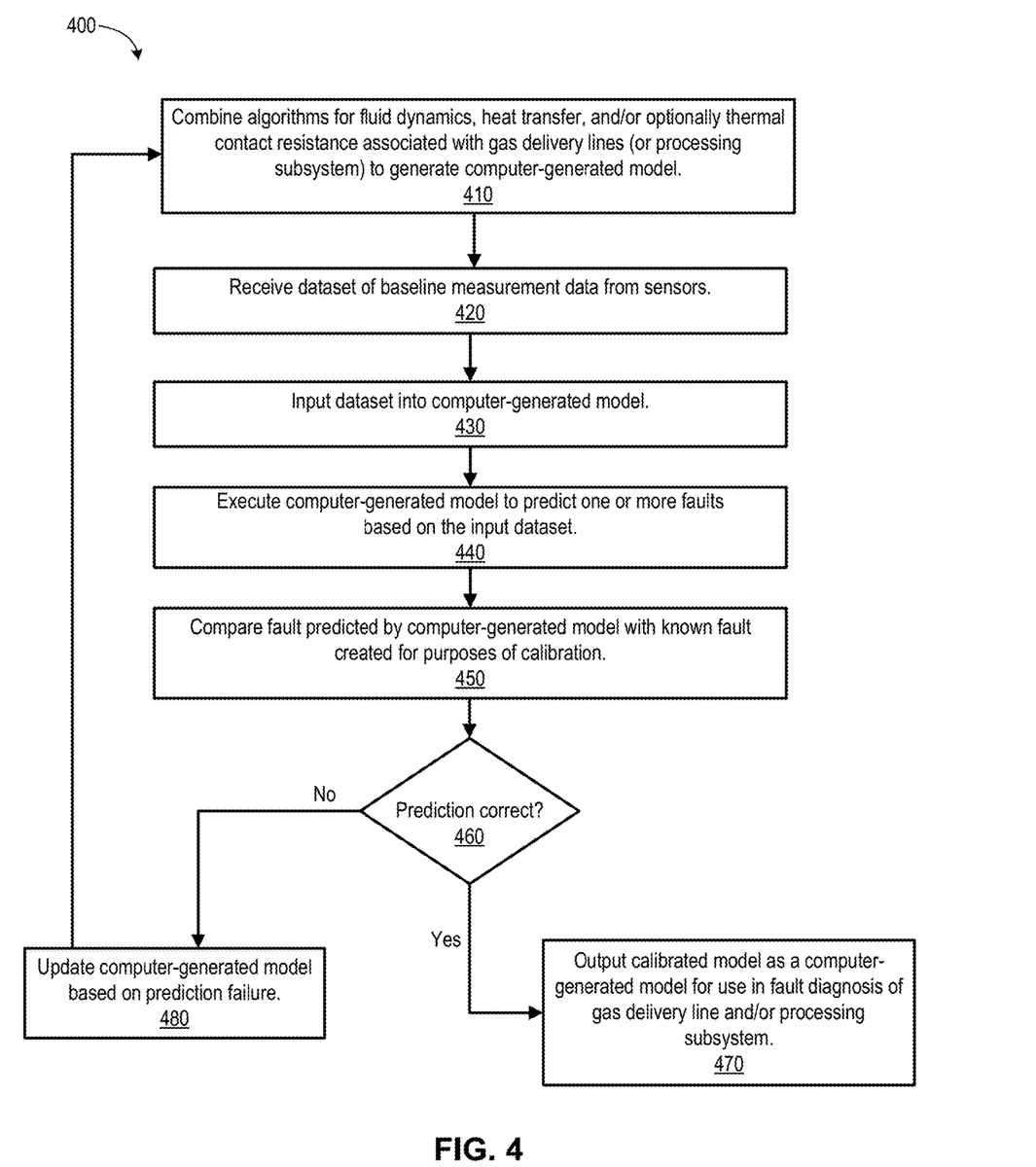
FIG. 4 is a flow diagram of a method for creating and calibrating a computer-generated model according to some implementations.

FIG. 4 is a flow diagram of a method 400 for creating and calibrating a computer-generated model according to some implementations. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the system 100 and components shown in FIGS. 1A-2A or any combination thereof. The method 400 can be performed using a single processing device or multiple processing devices. Some of the operations of method 400 can be optional, indicated by the dashed lines. In implementations, some operations of the method 400 are performed by a processing device (processor, central processing unit (CPU)) of the computing device 101.

At operation 410, the processing logic combines algorithms for fluid dynamics, heat transfer, and/or optionally thermal contact resistance associated with gas delivery lines (or a processing subsystem) to generate a computer-generated model. At operation 420, the processing logic receives a dataset of baseline measurement from the multiple sensors 140. The baseline measurement data can be taken when the system 100 is first brought online or after preventative maintenance and reset of the system 100.

At operation 430, the processing logic inputs the dataset into the computer-generated model, e.g., for purposes of calibration. At operation 440, the processing logic executes the computer-generated model to predict one or more faults based on the input dataset. In this way, the processing logic is to calibrate the computer-generated model 160 using baseline measurement data, which is compared to (or taking inferences from) an updated dataset of measurement data. At operation 450, the processing logic compares a fault predicted by the computer-generated model with a known fault created for purposes of calibration.

At operation 460, the processing logic determines whether the prediction determined at operation 450 is correct based on the comparison. For example, the prediction can be determined to ensure the computer-generated model 160 predicts the fault within a threshold level of accuracy, e.g., and is thus a correct prediction. If the prediction determined at operation 450 is correct, the processing logic, at operation 470, outputs a calibrated model as the computer-generated model 160 for use in fault diagnosis of the delivery line 120 and/or processing subsystem. Although temporarily complete at operation 470, the method 400 could be repeated at a later date using historical measurement data received in the interim, and thereby generate an updated calibrated model based on measurement data received during a period of time. If the prediction determined at operation 450 is incorrect, the processing logic, at operation 480, updates the computer-generated model based on prediction failure and loops back to operation 410 to continue calibration of the computer-generated model.

Figure 5:
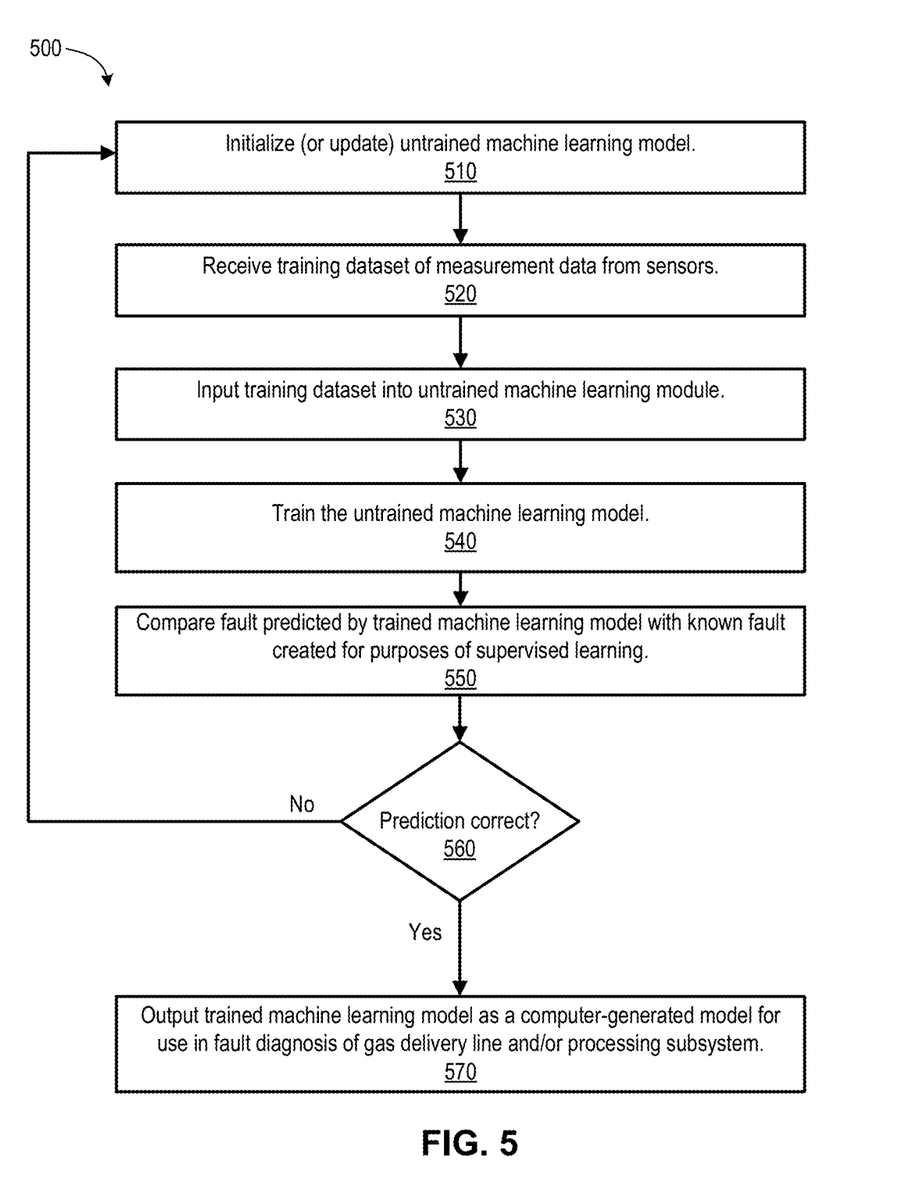
FIG. 5 is a flow diagram of a method for training a machine learning model to predict faults in the liquid conversion and gas delivery system according to some implementations.

FIG. 5 is a flow diagram of a method 500 for training a machine learning model to predict faults in the liquid conversion and gas delivery system according to some implementations. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the system 100 and components shown in FIGS. 1A-2A or any combination thereof. The method 500 can be performed using a single processing device or multiple processing devices. Some of the operations of method 500 can be optional, indicated by the dashed lines. In implementations, some operations of the method 500 are performed by a processing device (processor, central processing unit (CPU)) of the computing device 101, e.g., responsive to instructions issued by the machine learning module (MLM) 154.

At operation 510, the processing logic initializes (or updates if a later iteration of the method 500) an untrained machine learning model. At operation 520, the processing logic receives a training dataset of measurement data from the multiple sensors 140. This measurement data can come from different types of sensors or multiple types of sensors, depending on the focus of the machine learning model. In one implementation, the focus of the machine learning model is to predict a single parameter such as temperature, and this may be performed multiple times for different parameters, such as pressure, gas concentration, or power output of the heater jackets 128. In another implementation, the focus of the machine learning model is to predict a combination of parameters, which can be related, for example temperature and pressure or concentration and component molecules detected from an optical sensor.

At operation 530, the processing logic inputs the training dataset into the untrained machine learning module. At operation 540, the processing logic trains the untrained machine learning module to generate at least a partially trained machine learning model. At operation 550, the processing logic compares a fault predicted by the (at least partially) trained machine learning model with a known fault created for purposes of supervised learning.

With continued reference to FIG. 5, at operation 560, the processing logic determines whether the prediction determined at operation 550 matches the known fault against which the processing logic was comparing. If the prediction was not correct, the processing logic loops back to operation 510 to continue training the still (at least partially) untrained machine learning model. If the prediction was correct, however, at operation 570, the processing logic outputs a trained machine learning model as the computer-generated model 160 for use in fault diagnosis of the gas delivery line 120 and/or the processing subsystem previous discussed.

Figure 6:
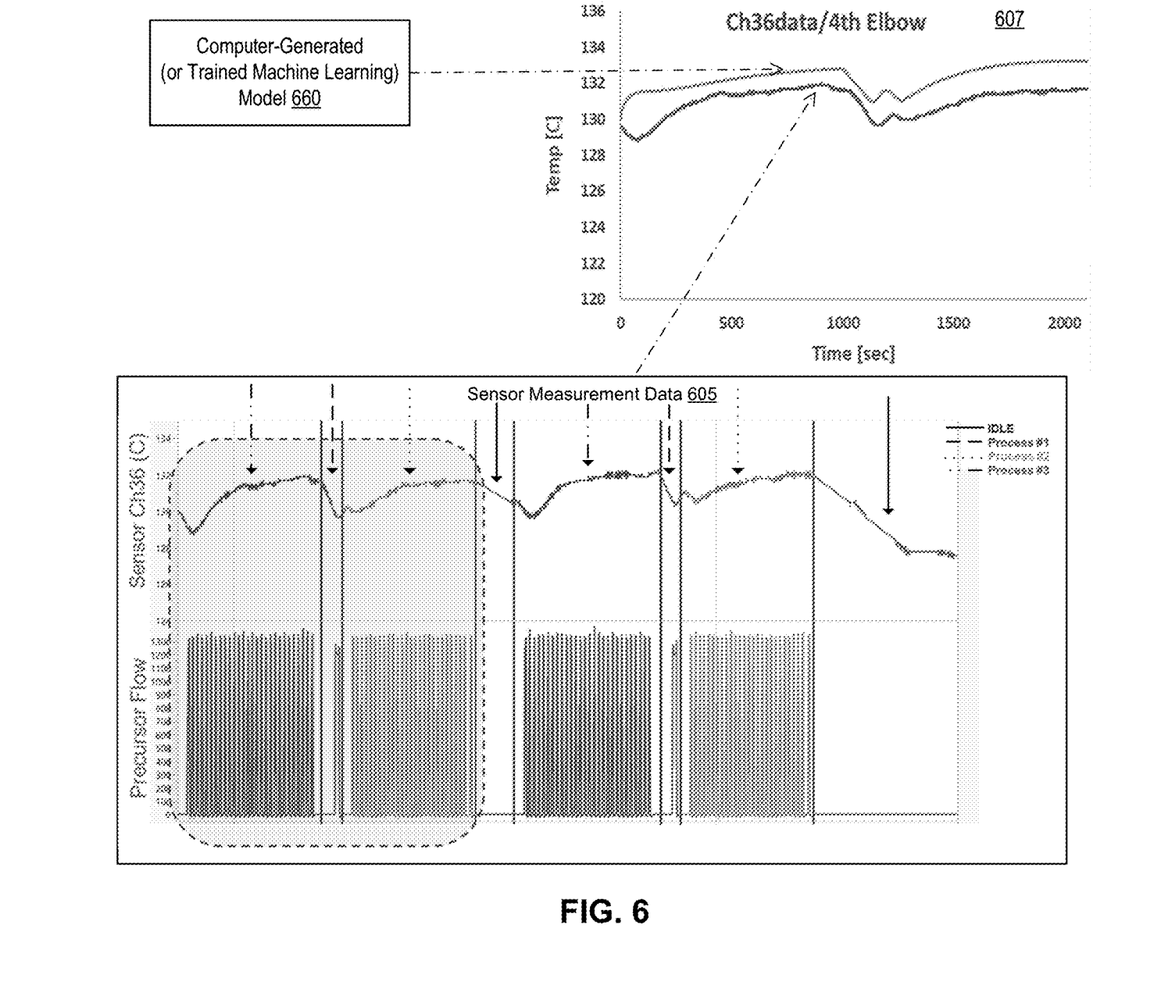
FIG. 6 is a set of graphs that illustrates sensor measurement data compared to a computer-generated model for one or more process parameters and from which a variation pattern can be generated according to an implementation.

FIG. 6 is a set of graphs that illustrates sensor measurement data compared to a computer-generated model for one or more process parameters and from which a variation pattern can be generated according to an implementation. For example, a set of sensor measurement data 605 (temperature for exemplary purposes) is received from at least one sensor identified as Ch36(C) at a fourth elbow of the delivery line 120. This sensor measurement data 605 can be graphed against the gas flow, e.g., a flow rate of the gaseous state of the precursor liquid. The sensor measurement data 605 can then be plotted on a single graph 607, which is illustrated as the lower line. The computer-generated model 160 (or machine learning model) can output its own prediction values onto the single graph 607, as the upper line in this case. Note that while there is a correspondence between the upper line and the lower line, there is some deviation that could be considered sufficiently significant to be considered a fault, particularly as seen at the beginning and at inflection points over time. The computing device 101 can generate a deviation pattern by subtracting the lower line from the upper line that can then be used in comparison against pre-stored deviation patterns to determine whether the deviation pattern matches one of many possible faults.

Figure 7:
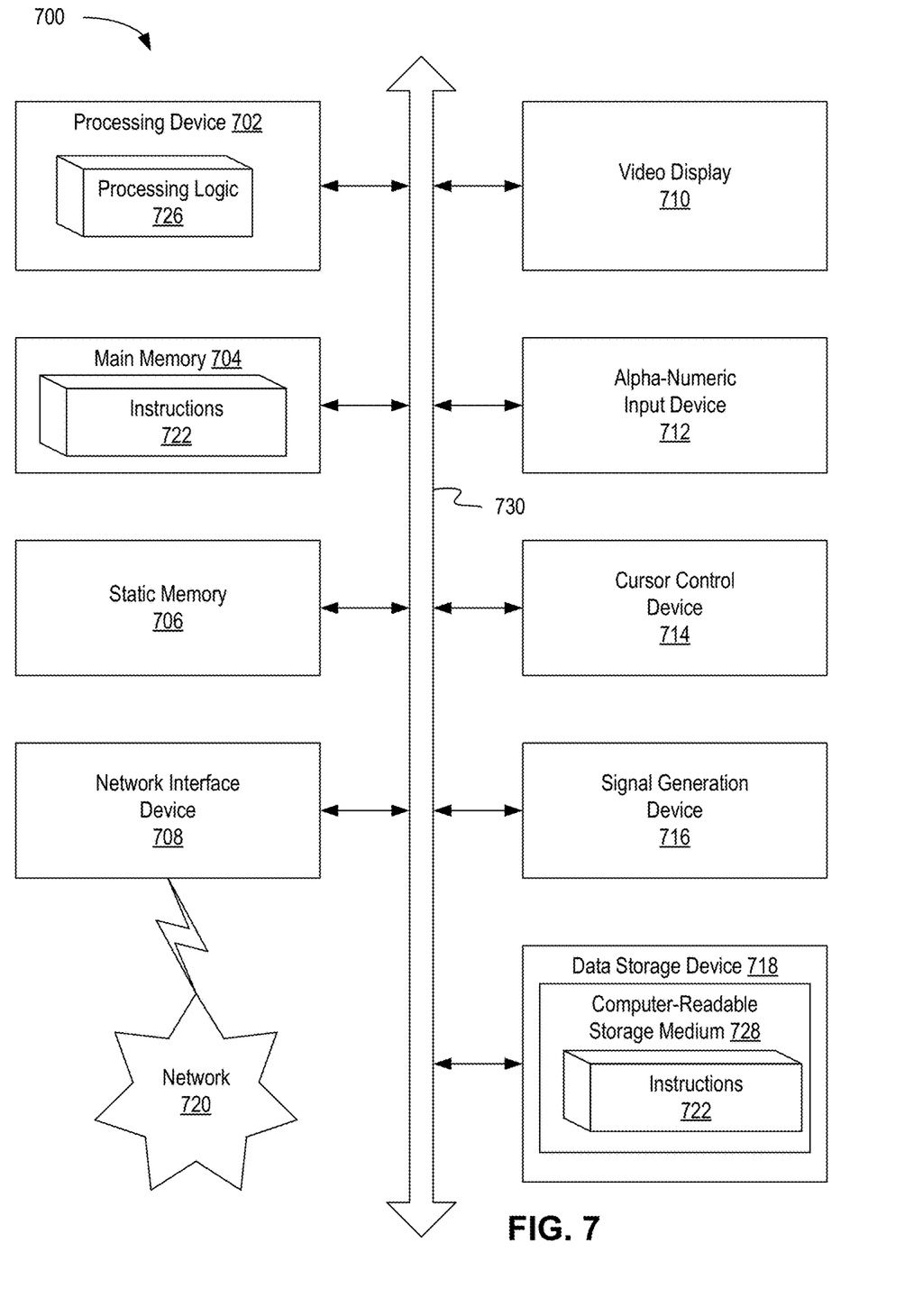
FIG. 7 depicts a block diagram of an example computing device operating in accordance with one or more aspects of the present disclosure and capable of parameter sensing and computer modeling for gas delivery health monitoring according to various implementations.

FIG. 7 depicts a block diagram of an example computing device 700 operating in accordance with one or more aspects of the present disclosure and capable of parameter sensing and computer modeling for gas delivery health monitoring according to various implementations. The computing device 700 can be the computing device 101 or a microcontroller of the computing device 101 of FIG. 1, in one implementation.

Example computing device 700 can be connected to other processing devices in a LAN, an intranet, an extranet, and/or the Internet. The computing device 700 can be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example computing device 700 can include a processing device 702 (e.g., a CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

The processing device 702 represents one or more general-purpose processing devices such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, the processing device 702 can be configured to execute instructions implementing method 300 of monitoring the health of delivery of a liquid in a gaseous state and/or the methods 400 and 500.

Example computing device 700 can further include a network interface device 708, which can be communicatively coupled to a network 720. Example computing device 700 can further include a video display 710 (e.g., a liquid crystal display (LCD), a touch screen, or a cathode ray tube (CRT)), an alphanumeric input device 712 (e.g., a keyboard), an input control device 714 (e.g., a cursor control device, a touch-screen control device, a mouse), and a signal generation device 716 (e.g., an acoustic speaker).

The computing device can include a data storage device 718, including a computer-readable storage medium (or, more specifically, a non-transitory computer-readable storage medium) 728 on which is stored one or more sets of executable instructions 722. In accordance with one or more aspects of the present disclosure, executable instructions 722 can include executable instructions implementing method 300 of monitoring the health of delivery of a liquid in a gaseous state and/or the methods 400 and 500.

Executable instructions 722 can also reside, completely or at least partially, within main memory 704 and/or within processing device 702 during execution thereof by example computing device 700, main memory 704 and processor 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" (or "non-transitory computer-readable medium storing instructions") should be taken to include a single medium or multiple media (e.g., a centralized or distributed database, and/or associated caches and servers) that store the one or more sets of operating instructions. The term "computer-readable storage medium" (or "non-transitory computer-readable medium storing instructions") shall also be taken to include any medium that is capable of storing or encoding a set of instructions for execution by the machine that cause the machine to perform any one or more of the methods described herein. The term "computer-readable storage medium" (or "non-transitory computer-readable medium") shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above can be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics can be combined in any suitable manner in one or more implementations.

In the foregoing specification, a detailed description has been given with reference to specific exemplary implementations. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but can refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   receiving measurement data from multiple sensors positioned along a delivery line that delivers a liquid as a gas to one of a gas panel or a processing chamber, wherein the delivery line comprises a plurality of sections, including elbows and zones;
   simulating, using a computer-generated model executed on a processing device, one or more process parameters related to the delivery line and a plurality of heater jackets positioned around the delivery line;
   comparing, by the processing device, the measurement data for a section of the plurality of sections with values of the one or more process parameters corresponding to the section;
   determining, by the processing device, based on at least a threshold deviation between the measurement data and the values of the one or more process parameters for the section, that a fault exists that is associated with maintaining temperature within the section of the delivery line consistent with a gaseous state of the liquid; and
   responsive to determining the fault, at least one of:
     causing processing within the processing chamber to be halted; or
     alerting an operator of the fault via an input/output device coupled to the processing device.

2. The method of claim 1, further comprising, in response to determining the fault exists, triggering a corrective action.

3. The method of claim 1, further comprising, in response to the determining the fault, waiting for input, via the input/output device from the operator, that indicates to proceed before continuing with the processing.

4. The method of claim 1, wherein the one or more process parameters is at least one of temperature, pressure, concentration of the gas, or power output of the plurality of heater jackets, wherein the method further comprises training a machine learning model using, as inputs, a training dataset measured by the multiple sensors and associated with the one or more process parameters to provide the computer-generated model.

5. The method of claim 1, wherein the computer-generated model comprises at least one of fluid dynamics equations, heat transfer equations, or thermal contact resistance equations associated with the delivery line.

6. The method of claim 1, wherein the method further comprises:
   performing reinforcement learning, based on the values of the one or more process parameters, to update the computer-generated model while processing within the processing chamber; and
   one of removing or taking offline one or more of the multiple sensors.

7. The method of claim 1, further comprising:
   determining a deviation pattern of the at least a threshold deviation between the measurement data and the values of the one or more process parameters; and
   determining a specific fault corresponding to the deviation pattern for the one or more process parameters.

8. The method of claim 7, wherein the specific fault comprises at least one of:
   leakage of ambient air, past the plurality of heater jackets, into direct contact with the delivery line;
   lack of sensitivity to change in flow rate of the gas;
   partial pressure of the gas predicted by the computer-generated model lower than a saturation pressure of the liquid;
   an input power to one or more of the plurality of heater jackets outside of a predetermined range that maintains a target temperature in the delivery line; or
   unexpected fluctuations in a sensor signal from one of the multiple sensors.

9. A system comprising:
   a memory;
   a plurality of sensors located along a delivery line that delivers a liquid as a gas to one of a gas panel or a processing chamber, the delivery line comprising a plurality of sections, including elbows and zones; and
   a processing device, operatively coupled to the memory and to the plurality of sensors, the processing device to:
     receive measurement data from the plurality of sensors;
     simulate, executing a computer-generated model, one or more process parameters related to the delivery line;
     compare the measurement data for a section of the plurality of sections with values of the one or more process parameters corresponding to the section;
     determine, based on at least a threshold deviation between the measurement data and the values of the one or more process parameters for the section, that a fault exists that is associated with maintaining temperature and pressure within the section of the delivery line consistent with a gaseous state of the liquid; and
     responsive to determining the fault, at least one of:
       causing processing within the processing chamber to be halted; or
       alerting an operator of the fault via an input/output device coupled to the processing device.

10. The system of claim 9, wherein the processing device is further to calibrate the computer-generated model using baseline measurement data of the plurality of sensors to ensure the computer-generated model predicts the fault within a threshold level of accuracy.

11. The system of claim 9, wherein the computer-generated model comprises at least one of fluid dynamics equations, heat transfer equations, or thermal contact resistance equations associated with the delivery line and statistical-based analysis of measurement data received from the plurality of sensors.

12. The system of claim 9, further comprising a processing subsystem, which comprises:
   the delivery line, of a set of delivery lines, to carry the liquid as the gas;
   a gas panel coupled to the set of delivery lines, the gas panel to feed the gas into the processing chamber through the delivery line;

a plurality of heater jackets positioned around the delivery line to maintain the temperature and pressure of the delivery line such as to maintain the liquid in the gaseous state; and the processing chamber.

13. The system of claim 12, wherein the plurality of sensors comprise one or more of a thermocouple, a pressure sensor, an optical sensor, a concentration sensor, a gas flow sensor, or a heater jacket power output sensor, and the processing device is further to train a machine learning model using, as inputs, a training dataset measured by the plurality of sensors and associated with the one or more process parameters to provide the computer-generated model.

14. The system of claim 12, wherein the processing device is further to:
  determine a deviation pattern of the at least a threshold deviation between the measurement data and the values of the one or more process parameters; and
  determine a specific fault corresponding to the deviation pattern for the one or more process parameters.

15. The system of claim 14, wherein the specific fault comprises at least one of:
  leakage of ambient air, past the plurality of heater jackets, into direct contact with the delivery line;
  lack of sensitivity to change in flow rate of the gas;
  partial pressure of the gas predicted by the computer-generated model lower than a saturation pressure of the liquid;
  an input power to one or more of the plurality of heater jackets outside of a predetermined range that maintains a target temperature in the delivery line;
  temperature of the gas in a chamber manifold is lower than historical temperature values; or
  unexpected fluctuations in a sensor signal from one of the plurality of sensors.

16. A non-transitory computer-readable medium storing instructions, which when executed by a processing device, perform a plurality of operations comprising:
  receiving measurement data from multiple sensors positioned along a delivery line that delivers a liquid as a gas to a processing chamber, wherein the delivery line comprises a plurality of sections, including elbows and zones;
  simulating, by executing a computer-generated model, one or more process parameters related to the delivery line and a plurality of heater jackets positioned around the delivery line;
  comparing the measurement data for a section of the plurality of sections with values of the one or more process parameters corresponding to the section;
  determining, based on at least a threshold deviation between the measurement data and the values of the one or more process parameters for the section, that a fault exists that is associated with maintaining temperature and pressure within the section of the delivery line consistent with a gaseous state of the liquid; and
  responsive to determining the fault, at least one of:
    causing processing within the processing chamber to be halted; or
    alerting an operator of the fault via an input/output device coupled to the processing device.

17. The non-transitory computer-readable medium of claim 16, wherein the operations further comprise calibrating the computer-generated model using baseline measurement data of the multiple sensors to ensure the computer-generated model predicts the fault within a threshold level of accuracy.

18. The non-transitory computer-readable medium of claim 16, wherein the computer-generated model comprises at least one of fluid dynamics equations, heat transfer equations, or thermal contact resistance equations associated with the delivery line and statistical-based analysis of measurement data received from the multiple sensors.

19. The non-transitory computer-readable medium of claim 16, wherein the one or more process parameters is at least one of temperature, pressure, concentration of the gas, or power output of the plurality of heater jackets, wherein the plurality of operations further comprise training a machine learning model using, as inputs, a training dataset measured by the multiple sensors and associated with the one or more process parameters to provide the computer-generated model.

* * * * *